(12) United States Patent
Hajaj et al.

(10) Patent No.: US 8,645,367 B1
(45) Date of Patent: Feb. 4, 2014

(54) PREDICTING DATA FOR DOCUMENT ATTRIBUTES BASED ON AGGREGATED DATA FOR REPEATED URL PATTERNS

(75) Inventors: Nissan Hajaj, Foster City, CA (US); Chi Zhang, Sunnyvale, CA (US); Changxun Wu, Sunnyvale, CA (US); Erik Gross, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 12/719,762

(22) Filed: Mar. 8, 2010

Related U.S. Application Data

(60) Provisional application No. 61/169,280, filed on Apr. 14, 2009.

(51) Int. Cl.
G06F 7/00 (2006.01)

(52) U.S. Cl.
USPC .............................. 707/727; 707/750; 707/917

(58) Field of Classification Search
None
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,539,377 B1 | 3/2003 | Culliss | |
| 6,816,850 B2 | 11/2004 | Culliss | |
| 6,882,999 B2 * | 4/2005 | Cohen et al. | 707/694 |
| 2005/0097204 A1 * | 5/2005 | Horowitz et al. | 709/223 |
| 2009/0287645 A1 * | 11/2009 | Dasdan et al. | 707/3 |

OTHER PUBLICATIONS

Joachims, "Evaluating Search Engines Using Clickthrough Data", Cornell University, Department of Computer Science, Draft, Feb. 19, 2002, 13 pages.
Joachims; Optimizing search engines using clickthrough data; 2002; Proceedings of the ACM SIGKDD International Conference on Knowledge Discovery and Data Mining, p. 133-142, 10 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

* cited by examiner

Primary Examiner — Paul Kim
(74) Attorney, Agent, or Firm — Fish & Richardson P.C.

(57) ABSTRACT

One or more hierarchies of string patterns are generated a plurality of URL strings according to a pattern extraction procedure. Repeated string patterns are selected from the generated hierarchies of string patterns. A URL class is defined for each of selected repeated string patterns. Each URL class is associated with a respective group of URL strings in the plurality of URL strings, where the respective group of URL strings contains a repeated string pattern that defines the URL class. Respective aggregated data is calculated for each URL class. The respective aggregated data is based on respective data of each respective document of each URL string in the group of URL strings associated with the URL class. Respective data for a respective document referenced by a lookup-URL is predicted based on respective aggregated data of one or more of the URL classes.

12 Claims, 12 Drawing Sheets

6000

Receiving a plurality of Uniform Resource Locator (URL) strings, each URL string referring to a respective document, each respective document being associated with respective data, the respective data being indicative of user behavior relative to the respective document as a search result for queries
6002

Generating one or more hierarchies of string patterns from each of the plurality of URL strings according to a pattern extraction procedure
6004

Selecting a plurality of repeated string patterns from the generated hierarchies of string patterns for the plurality of URL strings
6006

Defining a URL class for each of the plurality of repeated string patterns, each URL class being associated with a respective group of URL strings in the plurality of URL strings, where the respective group of URL strings contains a repeated string pattern that defines the URL class
6008

Calculating respective aggregated data for each respective URL class, the respective aggregated data being based on respective data of each respective document of each URL string in the group of URL strings associated with the URL class
6010

Predicting respective data for a document referenced by a lookup-URL, the predicting being based on respective aggregated data of one or more of the URL classes
6012

```
Receiving a plurality of Uniform Resource Locator (URL) strings, each URL string
referring to a respective document, each respective document being associated with
respective data for a document attribute
                                                                          7002
```

```
Generating one or more hierarchies of string patterns from each of the plurality of
URL strings according to a pattern extraction procedure
                                                                          7004
```

```
Selecting a plurality of repeated string patterns from the generated hierarchies of
string patterns for the plurality of URL strings
                                                                          7006
```

```
Defining a URL class for each of the plurality of repeated string patterns, each URL
class being associated with a respective group of URL strings in the plurality of URL
strings, where the respective group of URL strings contains a repeated string pattern
that defines the URL class                                                7008
```

```
Calculating respective aggregated data for each URL class, the respective aggregated
data being based on respective data of each respective document of each URL string
in the group of URL strings associated with the URL class                 7010
```

```
Predicting respective data for a respective document referenced by a lookup-URL, the
predicting being based on respective aggregated data of one or more of the URL
classes                                                                   7012
```

PREDICTING DATA FOR DOCUMENT ATTRIBUTES BASED ON AGGREGATED DATA FOR REPEATED URL PATTERNS

CROSS-REFERENCE TO RELATED APPLICATION

Under 35 U.S.C. §119, this application claims benefit of pending U.S. Provisional Application Ser. No. 61/169,280, filed Apr. 14, 2009, the entire contents of which is hereby incorporated by reference.

BACKGROUND

An Internet search engine is a tool typically designed to search for information on the World Wide Web. Users submit search queries to the search engine and the search engine identifies and presents a list of result documents in response to each search query. The list of result documents consist of webpages, images, sounds, and other types of files, typically identified and retrievable by their uniform resource locators (URLs). The list of result documents are typically ranked according to various relevance and quality parameters before being presented to the user.

A web crawler is a computer program that browses the World Wide Web in a methodical, automated manner. In general, the web crawler starts with a list of "seed" URLs. As the web crawler visits each URL, it collects hyperlinks found in the visited page, and adds them to the list of URLs to visit, called the "crawl frontier." URLs from the "crawl frontier" are recursively visited and sometimes revisited according to a set of crawl policies. The web crawler downloads a copy of all the visited pages for later processing by a search engine. The search engine creates and stores an index of the downloaded pages. The stored index is used to optimize speed and performance in finding relevant documents for a search query.

SUMMARY

This specification describes technologies relating to predicting data for document attributes of Internet documents.

In one aspect, a plurality of Uniform Resource Locator (URL) strings are received. Each URL string refers to a respective document. Each respective document is associated with respective data. The respective data is indicative of user behavior relative to the respective document as a search result for queries. One or more hierarchies of string patterns are generated from each of the plurality of URL strings according to a pattern extraction procedure. A plurality of repeated string patterns are selected from the generated hierarchies of string patterns for the plurality of URL strings. A URL class is defined for each of the plurality of repeated string patterns. Each URL class is associated with a respective group of URL strings in the plurality of URL strings, where the respective group of URL strings contains a repeated string pattern that defines the URL class. Respective aggregated data is calculated for each respective URL class. The respective aggregated data is based on respective data of each respective document of each URL string in the group of URL strings associated with the URL class. Respective data for a document referenced by a lookup-URL is predicted. The prediction is based on respective aggregated data of one or more of the URL classes.

In some implementations, each respective data includes a click-count. In some implementations, the click-count is weighted by click-duration. In some implementations, the click-count is weighted by click-recency. In some implementations, each respective data includes a click-to-impression ratio.

In some implementations, the hierarchies of string patterns are generated from each of the plurality of URL strings according to the pattern extraction procedure. To generate the hierarchies of string patterns, one or more substrings in the URL string are identified, where each of the one or more substrings represents a corresponding argument for retrieving the respective document referenced by the URL string. A set of first string patterns are obtained by individually replacing each of the one or more substrings in the URL string with a wildcard. A second string pattern is obtained by replacing all of the one or more substrings in the URL string with the wildcard.

In some implementations, to generate the hierarchies of string patterns, a substring in the URL string is identified, where the substring represents a file path containing successive segments, the successive segments identifying a site, a root directory, one or more successive subdirectories, and a destination file, respectively. String patterns are obtained by successively truncating the file path from the URL string segment by segment.

In some implementations, to generate the hierarchies of string patterns, a substring in the URL string is identified, where the substring represents a site name, the site name containing successive segments identifying a host name and a domain name, respectively. A first hierarchy of string patterns is obtained, where each string pattern in the first hierarchy includes both the host name and the domain name. A second hierarchy of string patterns is obtained, where each string pattern in the second hierarchy includes the domain name but not the host name.

In some implementations, to predict the respective data for the document referenced by the lookup-URL, the lookup URL is received. One or more other hierarchies of string patterns are generated from the lookup-URL according to the pattern extraction procedure. Presence of a first set of one or more of the repeated string patterns are detected in the generated other hierarchies of string patterns. The lookup-URL is associated with a first set of the one or more of the URL classes, where each of first set of URL classes is defined by one of the first set of repeated string patterns. The respective data for the document referenced by the lookup-URL is calculated. The calculation is based on the respective aggregated data associated with the first set of URL classes.

In some implementations, the lookup-URL is associated with a first URL class and a second URL class, where the first URL class is of a higher level of specificity than the second URL class. To calculate the respective data for the document referenced by the lookup-URL, a first estimated data is obtained based on respective aggregated data of the first URL class. A second estimated data is obtained based on respective aggregated data of the second URL class. The first estimated data and the second estimated data are integrated to obtain the respective data for the document referenced by the lookup-URL while affording more deference to the first estimated data than to the second estimated data.

In one aspect, a plurality of Uniform Resource Locator (URL) strings are received. Each URL string refers to a respective document. Each respective document is associated with respective data for a document attribute. One or more hierarchies of string patterns are generated from each of the plurality of URL strings according to a pattern extraction procedure. A plurality of repeated string patterns are selected from the generated hierarchies of string patterns for the plurality of URL strings. A URL class is defined for each of the plurality of repeated string patterns. Each URL class is associated with a respective group of URL strings in the plurality of URL strings, where the respective group of URL strings contains a repeated string pattern that defines the URL class. Respective aggregated data is calculated for each URL class. The respective aggregated data is based on respective data of each respective document of each URL string in the group of URL strings associated with the URL class. Respective data for a respective document referenced by a lookup-URL is predicted. The prediction is based on respective aggregated data of one or more of the URL classes.

In some implementations, the document attribute is a life expectancy of a document, and the respective data for the document attribute is duration between initial detection and a subsequent detection failure of the document by an information retrieval system. In some implementation, the document attribute is a life expectancy of a document, and the respective data for the document attribute is duration between initial detection of a first version of the document and a subsequent detection of a second version of the document. In some implementations, the document attribute is a measure of quality for a document, and the respective data for the document attribute is a number of links to the document by other documents. In some implementations, the document attribute is a measure of commerciality for a document, and the respective data for the document attribute is a number of advertisements present in the document. In some implementations, the document attribute is a topical category for a document, and the respective data for the document attribute is a number of predetermined keywords for the topical category that are present in the document.

In some implementations, to predict the respective data for the respective document referenced by the lookup-URL, the lookup-URL is received. One or more other hierarchies of string patterns are generated from the lookup-URL according to the pattern extraction procedure. Presence of a first set of one or more of the repeated string patterns are detected in the generated other hierarchies of string patterns. The lookup-URL is associated with a first set of the one or more of the URL classes, where each of the first set of the URL classes is defined by one of the first set of repeated string patterns. The respective data for the document referenced by the lookup-URL is calculated. The calculation is based on the respective aggregated data associated with the first set of URL classes.

In some implementations, the predicted respective data is provided as input to a crawl scheduling process of an information retrieval system. In some implementations, the predicted respective data is provided as input to an index selection process of an information retrieval system. In some implementations, the predicted respective data is provided as input to a search result ranking process of an information retrieval system.

Particular embodiments of the subject matter described in this specification can be implemented to realize one or more of the following advantages. First, predictions of data for document attributes, such as document importance and document quality, enable a web crawler to improve its download scheduling. There are a vast number of documents on the Internet. The web crawler is only capable of accessing a small fraction of all available documents on the web within any reasonable amount of time. Among all of the URLs that the web crawler encounters as it crawls the web, it is advantageous for the crawler to intelligently select only the most important and relevant documents to download based on the data predictions.

Similarly, it is expensive to create and maintain a search index of all downloaded documents. It is more efficient to maintain an index of only those documents that are likely to be of interest to users. User feedback statistics for a document can be indicative of documents' importance, popularity, relevance, or quality. By predicting documents' user feedback statistics based on the documents' URLs, the index engine of an information retrieval system can prioritize document indexing based on the data predictions. In some instances, documents may be removed from an index to conserve storage and maintenance resources if data predictions for the documents indicate low relevance and quality.

In addition, some web documents change frequently or have limited lifespan. In order to maintain an accurate and up-to-date search index, these documents may have to be revisited and re-indexed from time to time. Predictions of documents' lifespan and update-frequencies based on the documents' URLs are useful to reduce unnecessary revisits while limiting the number of obsolete documents in the search index.

In addition to crawl scheduling and index selection, data predictions, such as for user feedback statistics, can be used in search result ranking. Some documents, such as newly discovered or newly created documents, do not have extensive historic user feedback data available. Predictions of user feedback data provide some guidance on how these documents would be received by users as search results for queries.

In addition to user feedback statistics, lifespan, and update frequencies, signals of other document attributes can also be predicted based on URLs according to the subject matter described in this specification. For example, content or topical categories of documents can be predicted based on aggregated content data of repeated string patterns found in the documents' URLs. Other composite signals based on several types of raw data are predicted based on aggregated composite signals of repeated string patterns found in the URLs. Because many types of composite signals for document attributes require much time and resources to generate, predictions of these composite signals based on URLs provide a fast and inexpensive alternative before actual computations of the signals are performed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6A is a flow diagram of an example process for predicting user feedback statistics for a lookup-URL based on aggregated data of repeated URL patterns.

FIG. 7A is a flow diagram of an example process for predicting data for a document attribute of a lookup-URL based on aggregated data of repeated URL patterns.

Like reference numbers and designations in the various drawings indicate like elements.

DETAILED DESCRIPTION

Figure 1:
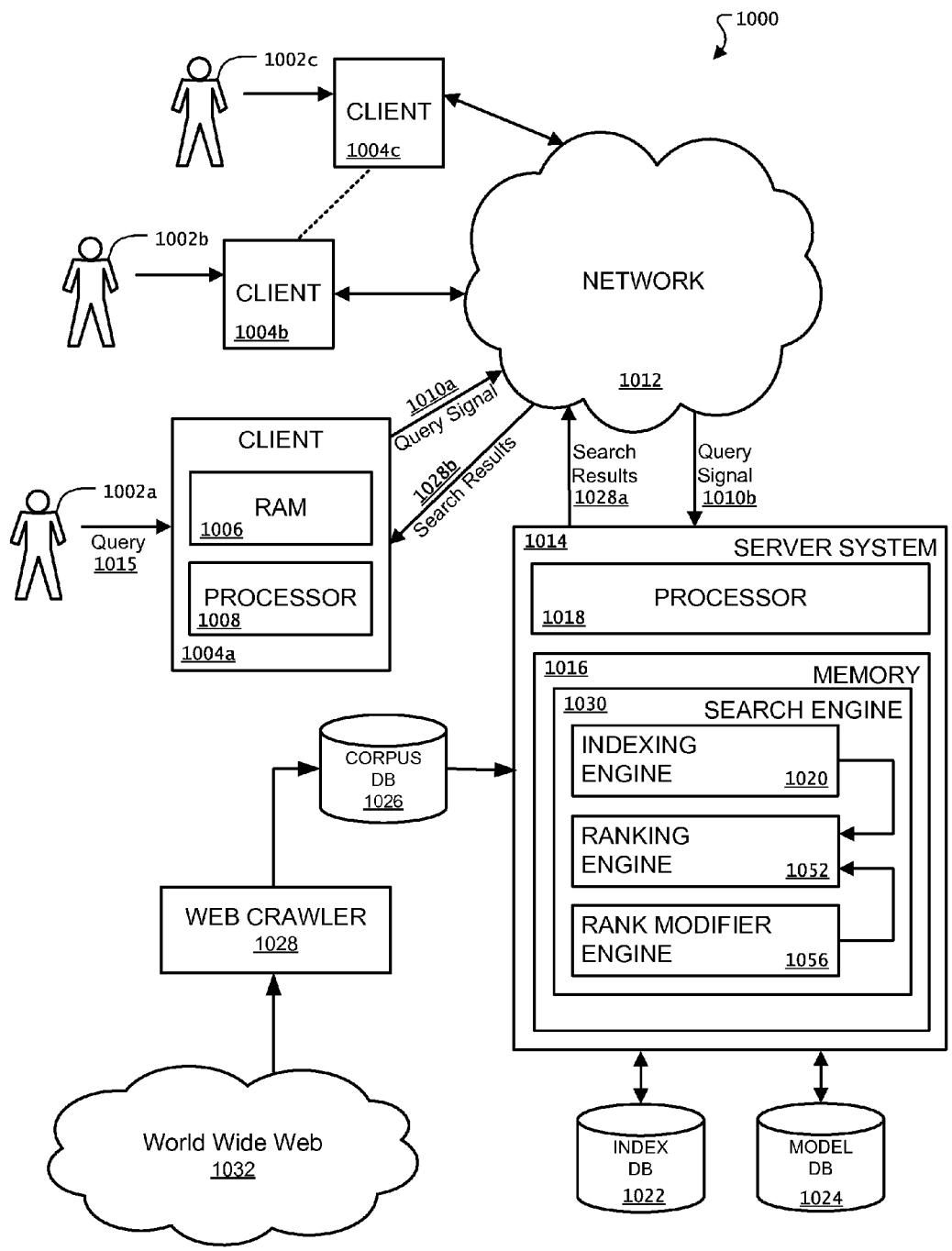
FIG. 1 illustrates an example information retrieval system.

FIG. 1 shows an example information retrieval system 1000. The information retrieval system retrieves relevant results in response to search queries submitted by users. The system 1000 is an example of an information retrieval system in which the systems, components, and processes described below can be implemented. Although several components are illustrated, there may be fewer or more components in the system 1000. Moreover, the components can be distributed on one or more computing devices connected by one or more networks or other suitable communication mediums.

In the example system 1000, a user 1002 (1002a, 1002b, 1002c) interacts with the system 1000 through a client device 1004 (1004a, 1004b, 1004c) or other device. The client device 1004 can be a computer terminal within a local area network (LAN) or wide area network (WAN). The client device 1004 includes a random access memory (RAM) 1006 (or other memory and/or a storage device) and a processor 1008. The processor 1008 is structured to process instructions within the device 1004. The processor 1008 is a single-threaded or multi-threaded processor having one or more processor cores, for example. In some implementations, the processor 1008 is structured to process instructions stored in the RAM 1006 (or other memory and/or a storage device included with the client device 1004) to display graphical information for a user interface.

A user 1002a connects to the search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 is one or more server devices in one or more locations. A server device 1014 includes a memory device 1016, which includes the search engine 1030 loaded therein. A processor 1018 is structured to process instructions within the device 1014. These instructions implement one or more components of the search engine 1030. The processor 1018 is a single-threaded or multi-threaded processor having one or more processing cores, for example. The processor 1018 processes instructions stored in the memory 1016 related to the search engine 1030 and sends information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g. query terms) to find relevant documents. The search engine 1030 includes an indexing engine 1020 that actively searches a corpus database 1026 to index the documents found in that corpus database. The index information for the documents in the corpus is stored in an index database 1022. This index database 1022 is accessed to identify documents related to the user query 1015. Note that an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The corpus database 1026 is built and updated by a web crawler 1028. The web crawler 1028 starts its crawl over the World Wide Web 1032 with a set of "seed" URLs. The web crawler collects URLs (e.g., those found in hyperlinks) present on each visited page and place them in a queue of URLs to be visited, called "crawl front." The web crawler 1028 visits each URL in the "crawl front" according to various crawl policies implemented by a scheduling component of the web crawler. The crawl policies typically includes a selection policy for determining which document to download or to skip downloading, and a revisit policy for determining when to check for changes to a document or to remove a URL from the crawl front.

The search engine 1030 includes a ranking engine 1052 to rank the documents related to the user query 1015. The ranking of the documents is performed using techniques for determining an information retrieval (IR) score for indexed documents in view of a given query. The relevance of a particular document with respect to a particular search term or to other provided information can be determined by various appropriate techniques. For example, the general level of back-links to a document that contains matches for a search term may be used to infer a document's relevance. In particular, and by way of illustration, if a document is linked to by many other relevant documents, it is inferred that the linked document is particularly relevant. This inference is made because the authors of the pointing documents presumably point, for the most part, to other documents that are relevant to their audience. If the pointing documents are in turn the targets of links from other relevant documents, they are considered more relevant, and the first document is considered particularly relevant because it is the target of relevant (or even highly relevant) documents. Such a technique may be the determinant of a document's relevance or one of multiple determinants.

To further improve the accuracy of document ranking, the ranking engine 1052 receives additional signals from a rank modifier engine 1056 to assist in determining an appropriate ranking for the documents. The rank modifier engine 1056 provides one or more measures of relevance for the documents, which can be used by the ranking engine 1052 to improve the search results' ranking provided to the user 1002. The rank modifier engine 1056 can perform one or more of the operations described further below to generate the one or more measures of relevance. For example, the ranking of a particular document with respect to a particular search term can be influenced by user-feedback data collected from previous sessions where the same result document are presented for the same query entered by other users. If many users have shown interest in a particular result document for a particular query, for example, it is inferred that the document is particularly relevant for subsequent users that enter the same query as well. The ranking of this particular document is promoted in the list of result documents presented to the subsequent users. The user-feedback data collected over time is stored in a model database 1024. Many parameters of a user's response to a result document can be collected, and the data can be mined to derive signals of interest to improve the search engine and better serve the users.

The search engine 1030 forwards the final, ranked result list within a server-side search results signal 1028*a* through the network 1012. Exiting the network 1012, a client-side search results signal 1028*b* is received by the client device 1004*a* where the results are stored within the RAM 1006 and/or used by the processor 1008 to display the results on an output device for the user 1002*a*.

Figure 2A:
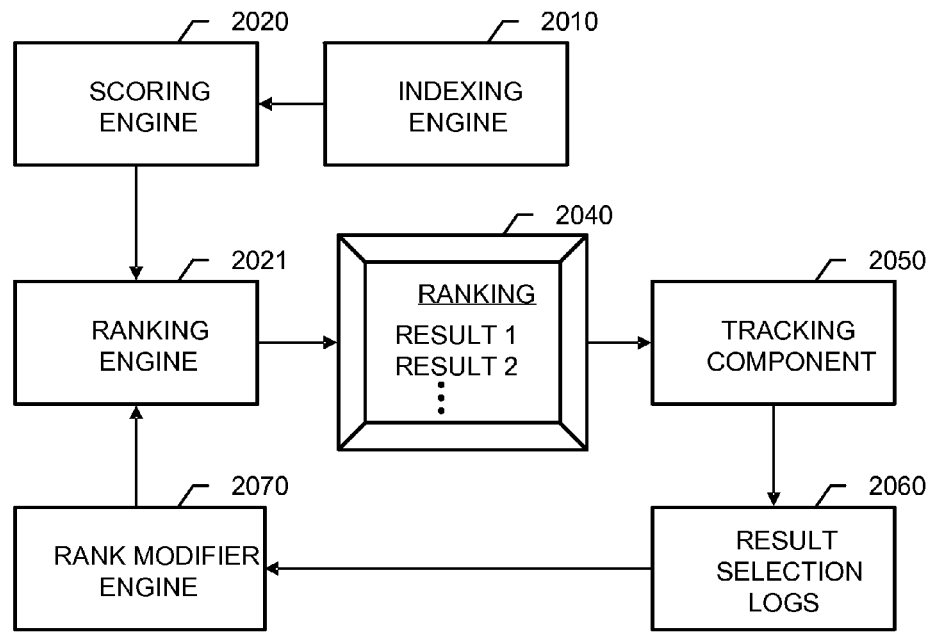
FIGS. 2A and 2B illustrates components of two example information retrieval systems.

FIG. 2A shows example components of an information retrieval system. These components include an indexing engine 2010, a scoring engine 2020, a ranking engine 2030, and a rank modifier engine 2070. The indexing engine 2010 functions as described above for the indexing engine 1020. The scoring engine 2020 generates scores for document results based on many different features, including content-based features that link a query to document results, and query-independent features that generally indicate the quality of documents results. The content-based features include, for example, aspects of document format, such as query matches to title or anchor text in an HTML (Hyper Text Markup Language) page. The query-independent features include, for example, aspects of document cross-referencing of the document or the domain. Moreover, the particular functions used by the scoring engine 2020 can be tuned, to adjust the various feature contributions to the final IR score, using automatic or semi-automatic processes.

The ranking engine 2030 produces a ranking of document results 2040 for display to a user based on IR scores received from the scoring engine 2020 and one or more signals from the rank modifier engine 2070. A tracking component 2050 is used to record information regarding user behavior such as individual user selections of the results presented in the ranking 2040. In some implementations, the tracking component 2050 is embedded JavaScript code included in a web page ranking 2040 that identifies user selections (e.g., mouse clicks) of individual document results and also identifies when the user returns to the results page, thus indicating the amount of time the user spent viewing the selected document result. In other implementations, the tracking component 2050 is a proxy system through which user selections of the document results are routed. The tracking component can also include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information is stored in result selection logs 2060. In various implementations, the recorded information includes log entries that indicate user interaction with each result document presented for each query submitted. For each user selection of a result document presented for a query, the log entries indicate the query (Q), the document (D), the user's dwell time (T) on the document, the language (L) employed by the user, and the country (C) where the user is likely located (e.g., based on the server used to access the IR system). The log entries also records negative information, such as the fact that a document result was presented to a user, but was not selected. Other information such as position(s) of click(s) (i.e., user selection(s)) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main page and clicking on another document result is also recorded. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 2B:
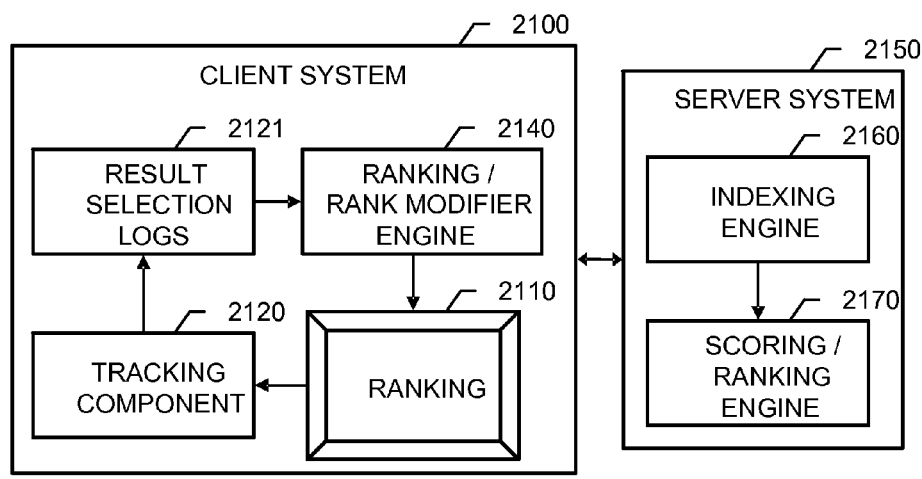

FIG. 2B shows another example information retrieval system. In this system, a server system 2150 includes an indexing engine 2160 and a scoring/ranking engine 2170. A client system 2100 includes a user interface for presenting a ranking 2110, a tracking component 2120, result selection logs 2121 and a ranking/rank modifier engine 2140. For example, the client system 2100 can include a company's enterprise network and personal computers, in which a browser plug-in incorporates the ranking/rank modifier engine 2140. When an employee in the company initiates a search on the server system 2150, the scoring/ranking engine 2170 can return the search results along with either an initial ranking or the actual IR scores for the results. The browser plug-in then re-ranks the results locally based on tracked page selections for the company-specific user base.

Figure 3:
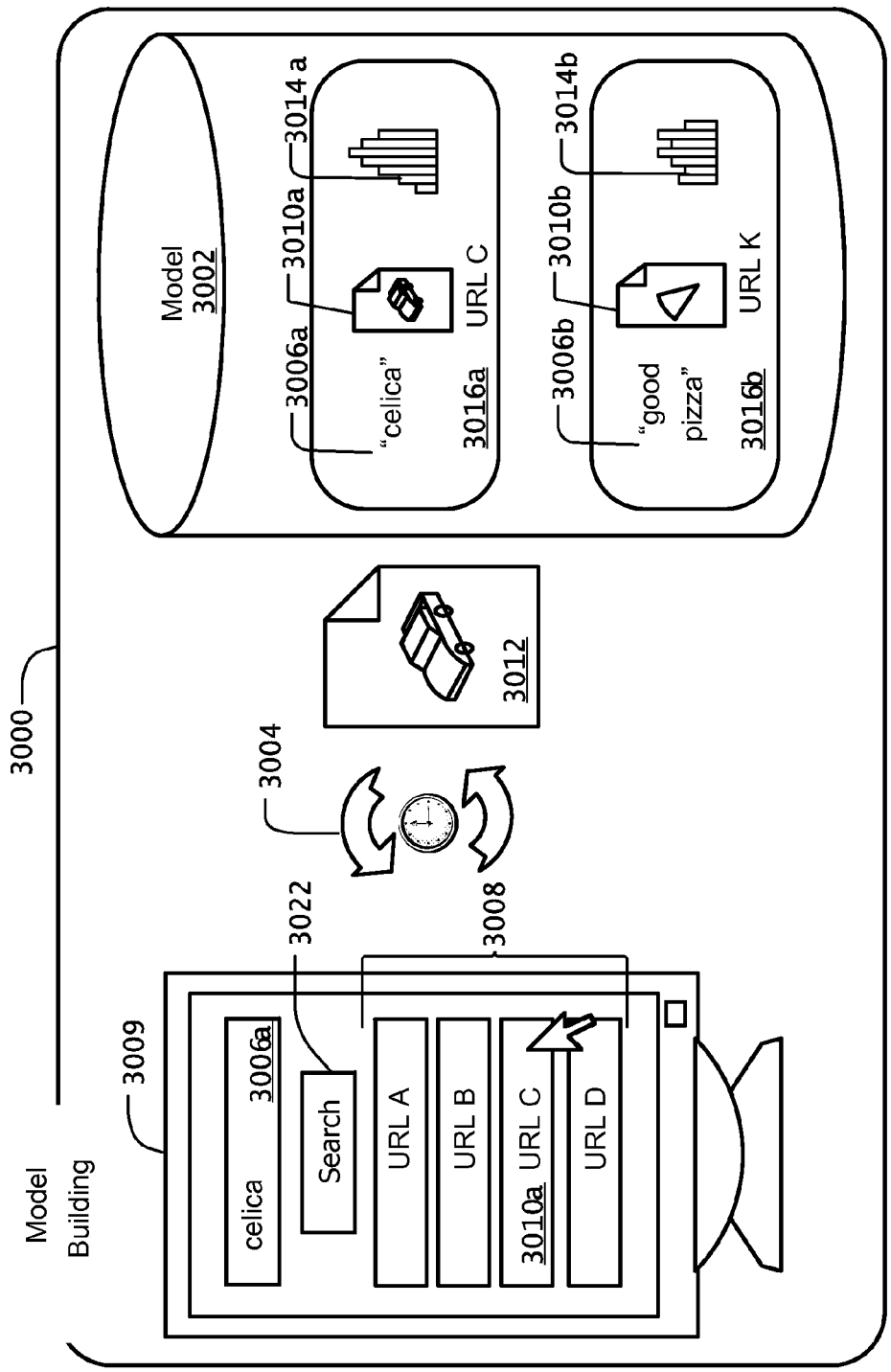
FIG. 3 illustrates an example user-feedback data model.

FIG. 3 is a diagram illustrating the building of an example model database 3002 for use with an information retrieval system. The model database 3002 is one or more databases that aggregate information indicative of user behavior on at least a per-query and per-document basis. In various implementations, information in the model database 3002 is used as input to a process that ranks documents or enhances the ranking. For example, the model information is used as input to interactive or non-interactive Internet search engines, image search engines, video search engines, book search engines, consumer product search engines, other suitable processes capable of ranking documents, and combinations of these. In various implementations, a document is referenced by a URL in the model database 3002. For instance, a document can be a webpage on the World Wide Web referenced by a URL. In various implementations, the model information is used as input to create a database of repeated URL patterns and corresponding aggregated data in accordance with the methods described in this specification.

As shown in FIG. 3 and by way of illustration, a user submits a query 3006*a* "celica," for example, to an information retrieval system, such as a search engine, through a graphical user interface 3009, as presented on a personal computer, a mobile telephone, or other device. A query includes one or more terms. Moreover, query terms can be in more than one language.

In response to the user selecting the search button 3012, for example, a search engine returns a ranking or result list 3008 which is an ordered list of references to documents that are responsive to the query 3006*a*. The result list 3008 includes a set of document references URL A, URL B, URL C (3010*a*), and URL D. The result list 3008 can contain the text of the URL itself, a short description of the information found within each document, a snapshot of the portion of the document which contains the query, other suitable information, or a combination of these. If a user selects (e.g., clicks) URL C 3010*a* from the result list 3008, for example, the selected URL can cause the user interface 3009 (e.g., a web browser) to present the associated document 5012. Once the user has finished viewing the document, the user can navigate back to the result list 3008.

In various implementations, the model database 3002 is built as users interact with search engines. Each presentation of a document reference in the result list that is visible to a user on a display device in response to a query is recorded as an "impression" of the referenced document in connection with the query. Each selection of the presented document reference is a recorded as a "click" for the document in connection with the query. A timer can be used to track how long a user views or "dwells" on the document. For example, a longer time spent dwelling on a document (i.e., a long click) can indicate that a user found the document to be relevant for the query. A brief period viewing a document (i.e., a short click) can be interpreted as a lack of document relevance. In some implementations, the click data 3014 is a count of clicks of all types (e.g., long, medium, short) for a particular query 3006 and document 3010 combination. In some implementations, the click data 3014 includes a count of each click type (e.g., long, medium, short) for a particular query 3006 and document 3010 combination. Aggregated click data from queries for a given document can be used to rank or enhance a ranking of that document. By way of illustration, a quantity of result statistics can be a weighted average of the count of long clicks for a given document and query pair.

A search engine or other process creates a record 3016 in the model database 3002 for documents that are selected by users in response to a query. Each record 3016 within the model 3002 (herein referred to as a tuple<document, query, data>) is at least a combination of a query 3006 submitted by users, a document reference 3010 selected by users in response to that query, and an aggregation of click data 3014 across all users that select the document reference 3010 in response to the query 3006. The aggregated click data across all users is viewed as an indication of document relevance. In various implementations, model data is locale-specific (e.g., country, state, etc.) or language-specific. Other extensions of model data are possible.

Model database 3002 is an example database containing one type of data, i.e., user-feedback statistics. User feedback statistics are important signals of document attributes, such as document importance, popularity, relevance, and quality. Other document attributes that are of interest to an information retrieval system include the lifespan, content, topical category, and commerciality of a document, for example. Each document attribute has many possible signals or types of data indicative of the document attribute. Composite signals based on multiple raw data sources are also possible. For example, one signal for document lifespan is the duration between the initial detection of a document and a subsequent detection failure of the document by a web crawler. An alternative signal for document lifespan is the duration between the initial detection of a first version of a document and a subsequent detection of a second version of the document. One signal for topical category is the number of occurrences for a particular set of keywords present in a document. One signal for commerciality of a document is the number of advertisements present on the document. An example composite signal for document quality is a score based on both the click-to-impression ratio for the document as a search result and the number of links to the document by other documents. Other composite signals for other document attributes are possible.

Signals of document attributes, such as user feedback data, are collected over time by the search engine. Signals for other document attributes, such as document lifespan, content and/or other structural features are obtained by the web crawler and the index engine, or another process, by revisiting URLs and/or processing downloaded documents.

Figure 4A:
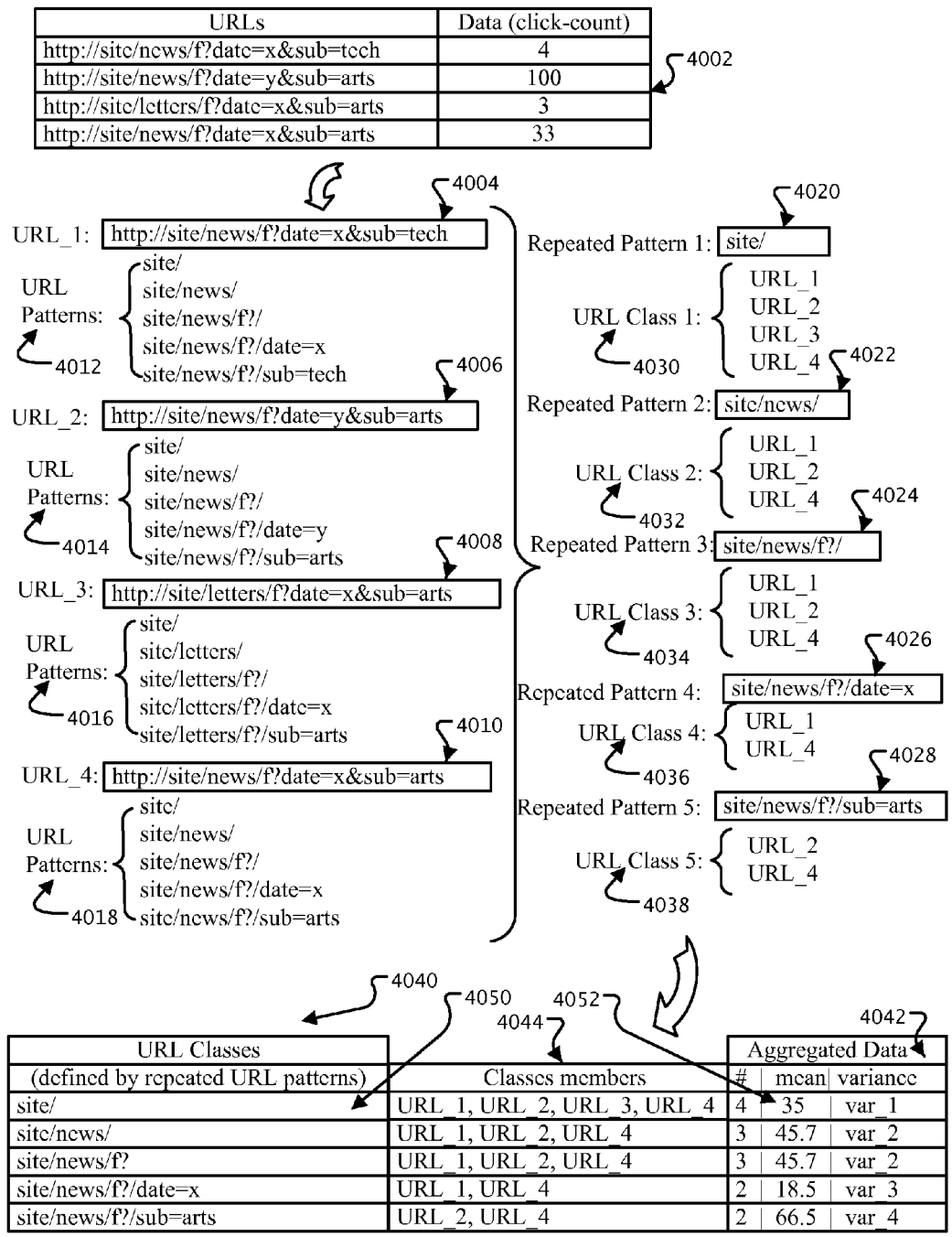
FIG. 4A illustrates an example process for creating an index of repeated URL patterns and corresponding aggregated user feedback data of each repeated URL pattern.
Figure 4B:
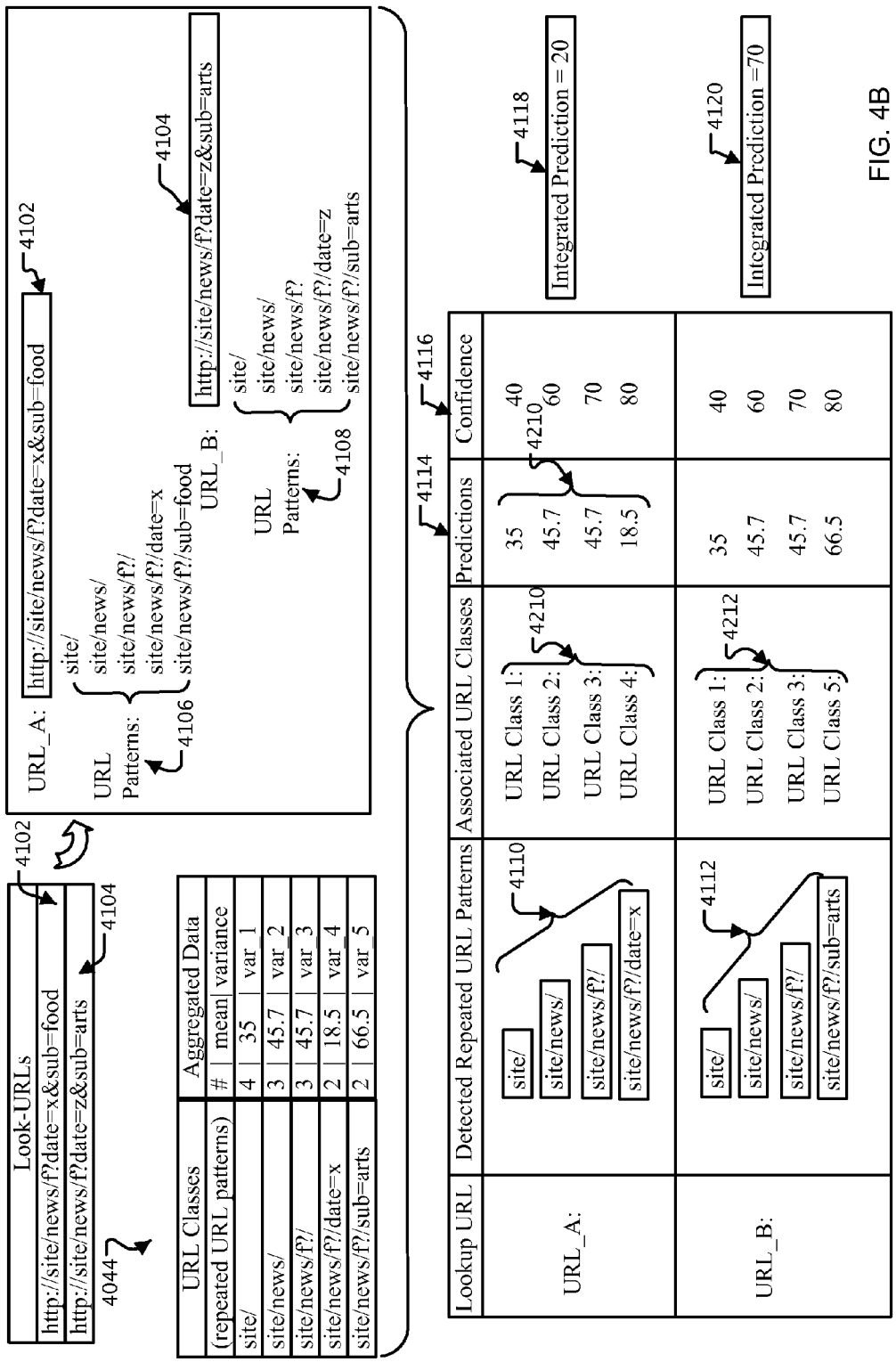
FIG. 4B illustrates an example process for predicting user feedback data for a lookup-URL based on the aggregated user feedback data in the index created in FIG. 4A.

FIGS. 4A and 4B illustrate the example processes for creating a database of repeated URL patterns and corresponding aggregated user feedback data, and for predicting user feedback data for other URLs using the database. The same method is applicable to other data or signals for various document attributes. Examples of document attributes include document importance, document relevance, document popularity, document freshness, document type, document content, topical category, document life expectancy, and so on. Signals for each document attributes can be raw counts or computed scores. For example, raw signals for document relevance include the number of relevant keywords present in a document, the number of links to the document by other relevant documents, the total number of clicks the document received when presented as a search result for a query, and so on. A computed signal for document relevance based on a number of raw signals include a click-to-impression ratio for the document, a computed relevance score based on the number of links to the document and the respective relevance scores of the linking documents, and so on.

FIG. 4A illustrates an example process for creating a database of repeated URL patterns and corresponding aggregated data (e.g., aggregated user feedback statistics). URL patterns (e.g., 4012, 4014, 4016, and 4018) are string patterns generated from URLs that have data available (e.g., historic user feedback statistics) for an associated document referenced by the URL in which the document was a search result for queries. In FIG. 4A, the URL patterns (e.g., 4012, 4014, 4016, and 4018) are generated from the URLs stored in the database 4002. Repeated URL patterns are common string patterns that are present in multiple URLs (e.g., "site/" and "site/news/" shown in the generated URL patterns in FIG. 4A). Each repeated URL pattern defines an URL class that includes a number of URLs containing the repeated URL pattern. For example, in FIG. 4A, the repeated URL pattern "site/" (4021) defines a URL class 4030, the URL class 4030 includes four URLs (4004, 4006, 4008, and 4010), and each of these four URLs contain the repeated URL pattern "site/" (4021). The user feedback statistics of those URLs in the URL class are aggregated to create a corresponding aggregated signal for the URL class and for the repeated URL pattern that defines the URL class. For example, in FIG. 4A, aggregated data (4052) for the URL class defined by "site/" (4050) is calculated based on the respective data of all four URLs included in the URL class (4050).

FIG. 4B illustrates an example process for obtaining a data prediction for a so-called lookup-URL that refers to a document that does not have any or lacks a sufficient level of historical user feedback as a search result for queries. A so-called lookup client, such as a web crawler or other process, submits URL patterns (e.g., 4102) generated from the lookup-URL to the database 4044 of repeated URL patterns. If the submitted URL patterns (e.g., 4102) match one or more of the repeated URL patterns stored in the database 4044, the database 4044 returns to the lookup client a number of predicted data from URL classes (e.g., 4210) that are defined by the matching repeated URL patterns (e.g., 4110). The lookup client integrates these predicted data (4114) to get a data prediction (4310) for the lookup URL. The basic presumption behind the data prediction is that URLs that share similar string patterns would behave similarly and have similar document attributes, and therefore would have similar data for those document attributes.

Generally speaking, in order to generate URL patterns from a URL, the URL is processed according to a pattern extraction procedure. In some implementations, the pattern extraction procedure is customized according to particular characteristics of the URLs and the intended use of the predicted data (e.g., for crawl scheduling, index selection, search result ranking, and so on). One example pattern extraction procedure utilizes the roughly hierarchical structure of a URL to generate one or more hierarchies of string patterns. Each generated string pattern is associated with a level of specificity in accordance with the string pattern's relative position in the hierarchies. The example pattern extraction procedure is described in more detail in the sections that follow. When integrating the predicted data from different URL classes, the predicted data from a more specific string pattern is given more deference than the predicted data from a more general string pattern.

Typically, a URL string includes a starting segment indicating a scheme of document retrieval, such as "http://," "file://," "ftp://," and so on. The scheme segment is typically removed from consideration when generating URL patterns from the URL. Following the scheme segment, the URL typically includes a segment indicating a site hosting the document (e.g., "www.cnn.com" or "weather.cnn.com"). The site segment typically includes two portions separated by a period: a first portion for a host name (e.g., "weather" in "weather.cnn.com"), and a second portion for a domain name (e.g., "cnn.com" in "weather.cnn.com"). For some website (e.g., a blog site), the host name is a username for a blogger (e.g., "tigger1" in "tigger1.blogspot.com"). In many instances, the URL's domain name portion includes a segment for a generic top-level domain extension, such as ".com," ".org," and so on. In some instances, the URL's domain name portion also includes a segment for a generic country code extension, such as ".uk," ".cn," and so on. In various implementations, the entire site name of the URL is pre-processed to reflect the true hierarchical relationship between the segments. As an illustrative example, a pre-processed URL string for "http://weather.cnn.com.uk/" is "uk/com/cnn/weather/." The exact form of the URL string varies depending on the exact implementation. Another example pre-processed URL string for the above URL is "uk.com.cnn.weather."

Following the domain name, the URL typically includes a file path leading to the document (e.g., "forecast/fiveday-weatherforecast/todaysweather.htm"). The file path typically includes successive segments from a root or primary directory (e.g., "forecast/") to successive subdirectories (e.g., "fivedayweatherforecast/"), and ending with the document ("todaysweather.htm"). In some instances, the file path does not include directories when the document resides on the host above any directory (e.g., "www.cnn.com/index.htm").

In some instances, the document is retrieved or dynamically generated by a process or script running on a web server hosting the document. The end of the file path includes the name of the script or program for retrieving or generating the document. Following the script name, the URL typically includes one or more arguments for the program or script to retrieve or generate the document. For example, in some URLs, the arguments follow the script name and are separated by an ampersand "&" (e.g., "getweather?date=today&type=fivedayforecast").

In some implementations, to generate one or more hierarchies of URL patterns from a URL, the segments of the URL are first rearranged to reflect a proper hierarchy. For example, a generic URL string is structured as "<country_code_extension> <generic_top_level_domain_extension> <domain> <host/> <root_directory> <successive_subdirectories> <file_name> <argument_1> . . . <argument_n>." Other arrangements of URL patterns are possible.

By way of illustration, in a first hierarchy of string patterns, the most specific string patterns are generated by individually replacing each of the arguments in the URL string with a wildcard. Each time, one argument in the original URL string is replaced with a wildcard, and one corresponding string pattern is generated. Then, a less specific (in other words, more general) string pattern is generated by replacing all of the arguments in the original URL string with a single wildcard. Afterwards, increasingly more general string patterns are generated by truncating the file path segment by segment from the remaining portion of the URL string. The truncation continues up to the host name, the domain name, and finally the generic top-level domain name extension, to generate the most general (or least specific) string patterns in the hierarchy.

As a more concrete example, a pre-processed URL string for "http://weather.cnn.com.uk/weather/fivedayforecast/getforcast?date=today" is "uk/com/cnn/weather/fivedatforecast/getforcast?/date=today/." A hierarchy of string patterns that is generated from this pre-processed URL string is illustrated in TABLE 1 below.

TABLE 1

| GENERATED PATTERN | |
|---|---|
| uk/ | Increasingly |
| uk/com/ | specific |
| uk/com/cnn/ | patterns |
| uk/com/cnn/weather/ | \| |
| uk/com/cnn/weather/fivedayforecast/ | \| |
| uk/com/cnn/weather/fivedayforecast/getforecast?/ | \| |
| uk/com/cnn/weather/fivedayforecast/getforecast?/date=today | \| |
| | V |

As another illustrative example, for a blog site, where a username is used as the host name, a URL "http://tigger1.blogspot.com/travel/springtravel/3_12_09.htm" is pre-processed to obtain a URL string "com/blogspot/tigger1/travel/springtravel/3_12_09." Two example hierarchies are generated. The first hierarchy is generated according to the example pattern extraction procedure described above. The second hierarchy is generated by replacing the host name in the first hierarchy of string patterns with a wildcard. The two hierarchies of string patterns are illustrated in TABLE 2 below.

TABLE 2

| GENERATED PATTERN (1$^{ST}$ HIERARCHY) | GENERATED PATTERN (2$^{ND}$ HIERARCHY) |
|---|---|
| com/ | |
| com/blogspot/ | |
| com/blogspot/tigger1/ | com/blogspot/*/ |
| com/blog spot/tigger1/travel/ | com/blogspot/*/travel/ |
| com/blog spot/tigger1/travel/springtravel/ | com/blogspot/*/travel/springtravel/ |
| com/blog spot/tigger1/travel/springtravel/3_12_09/ | com/blogspot/*/travel/springtravel/3_12_9/ |

Other pattern extraction procedures are possible. In one example, groups of related documents, such as documents following a common template, are identified by analyzing the structure and content of the documents. A common template is identifiable, for example, by similar positions of logos, images, layout of the content items on documents (e.g., webpages). Then, URLs for these related documents are collected and processed to identify URL patterns that are characteristic for these related documents. The identified URL patterns are stored and subsequently used to identify other related documents. An inference can be drawn that these other related documents behave similarly and have similar document attributes as those documents following the common template.

In FIG. 4A, the example process for creating a database 4044 of repeated URL patterns (or URL classes) starts with records of <URL, data> pairs shown in database 4002. As discussed with respect to FIG. 3, user feedback data are stored, for example, as tuples <document, query, data> in a data model. First, the user feedback data for a given document as a search result for queries is aggregated across queries to obtain the query-independent user feedback data shown in database 4002. The database 4002 is indexed by the URLs, for example, and the corresponding data include query-independent click-counts. In some implementations, the click-counts are weighted by click-duration, click-recency, or both. Other examples of user feedback data for a document include the mean, variance, and distribution of click-durations, the number of queries to which the document is responsive, the click-to-impression ratio of the document, and so on.

For illustrative purposes, four URLs are shown in the database 4002. These four URLs are collected from the same website "<site/>" because URLs from the same website are likely to generate repeated URL patterns. However, in general, URLs from many different sites are processed to create the database 4044 of repeated URL patterns.

First, each of the four URLs (4004, 4006, 4008, and 4010) is processed according to an example pattern extraction procedure described above. For each URL string, arguments in the URL string are replaced individually with a wildcard to create corresponding URL patterns. Then, all of the arguments in the URL string are replaced by a single wildcard to create another, more general URL pattern. Then, each segment of the file path in the URL string are successively truncated from the remaining portion of the URL string to create a number of increasingly general URL patterns. In the end, the site name itself is a URL pattern. In the interest of brevity, the site name in this example is not segmented further to create more URL patterns.

In this example, each URL is associated with a hierarchy of five URL string patterns (4012, 4014, 4016, and 4018). For example, URL_1 (4004) is associated with a "site/" pattern, a "site/news/" pattern, a "site/news/f?" pattern, a "site/news/f?/data=x" pattern, and a "site/news/f?/sub=tech" pattern. URL_2 (4006), URL_3 (4008), and URL_4 (4010) are similarly associated with their respective hierarchies of five string patterns (4012, 4014, 4016, and 4018) as shown in FIG. 4A.

Once the hierarchies of string patterns are generated for each URL string, a URL classification process begins. The URL classification process collects all of the URL patterns that have been generated, and identifies those URL patterns that appear in multiple URLs. The URL patterns that appear in multiple URLs are designated as the repeated URL patterns. In this example, out of the 20 URL patterns that are generated, there are five repeated URL patterns: "site/" (4020), "site/news/" (4022), "site/news/f?" (4024), "site/news/f?/date=x," (4026), and site/news/f?/sub=art" (4028).

Each of these five repeated URL patterns appear in more than one URL (i.e., they are present in the generated string patterns of multiple URLs). Each of these five repeated URL patterns defines a corresponding URL class (4030, 4032, 4034, 4036, and 4038). Each of the URL classes includes the URLs that contain the corresponding repeated URL pattern that defines the URL class. For example, URL Class 1 (4030) includes all four URLs because these four URLs all contain the URL pattern "site/." URL Class 5 (4038) includes URL_2 (4006) and URL_4 (4010) because only URL_2 and URL_5 contain the repeated URL pattern "site/news/f?/sub=arts" (4028).

For URLs classes associated with the same site, a URL class that is defined by a more general repeated URL pattern includes a greater number of URLs from the site; and a URL class that is defined by a more specific repeated URL pattern includes a smaller number of URLs from the site. For example, in FIG. 4A, the repeated URL pattern "site/" is the most general repeated URL pattern among the five repeated URL patterns, and URL Class 1 that is defined by the pattern "site/" includes all four of the URLs. In contrast, the repeated URL pattern "site/news/f?/sub=art" is one of the most specific repeated URL patterns, and URL Class 5 that is defined by "site/news/f?/sub=arts" includes only two URLs.

In some implementations, a URL pattern needs to appear in a minimum threshold number of generated URL strings before it is used to define a URL class. In some implementations, each distinct URL pattern is used to define a URL class, even if only one URL string contains that particular URL pattern. In some implementations, the number of defined URL classes and the number of URLs included in each URL class grow as more URLs are processed.

In FIG. 4A, after the URL classification process is completed and the URLs are associated with their respective set of URL classes, an aggregated data or signal is calculated for each of the URL classes. The aggregated data is stored in the database 4044 of repeated URL patterns. The database 4044 is indexed by the repeated URL patterns that defined each URL class. The repeated URL patterns 4040 serve as keys to the aggregated data in the database 4044. The aggregated data of each repeated URL pattern and corresponding URL class is based on the associated data of all URLs included in the URL class. The method of aggregation varies depending on the type of data that is aggregated. The database 4044 optionally identifies all the URLs within each URL class (i.e., Class Members).

By way of illustration, the data is query-independent click-counts for URLs. The aggregated data 4042 for the URL class include the total number of URLs in the URL class and the mean and the variance of the click-count for the URLs in the URL class. In some implementations, other user feedback data are included in the database 4002, and other aggregated data or signals are computed for each URL class. For example, for each URL class, class aggregated signals for click-duration, click-to-impression ratio, and so on, can be determined and associated with the repeated URL pattern that defines the URL class. In some implementations, the specificity level of the URL class is included in the database 4044 as well.

Once the database 4044 of repeated URL patterns and corresponding aggregated data or signals are generated, the database 4044 is used to generate predictions for other URLs through a lookup process. FIG. 4B illustrates an example process for utilizing the database 4044 created in FIG. 4A to predict or estimate user feedback data for two lookup-URLs (4102 and 4104) that have not yet accumulated such any or a sufficient amount of feedback data.

In this example, the database 4044 is structured as a key-value table. Other database structures are possible. In the table, the repeated URL patterns are used as the keys to the aggregated data of the corresponding URL classes. In this example, the aggregated data includes the total number of URLs in the URL class, the mean and the variance of the user feedback data among all the URLs included in the URL class.

The two lookup-URLs (4102 and 4104) are submitted by a lookup client (e.g., a web crawler, index engine, a ranking engine of an information retrieval system, or another process). The lookup client seeks predictions of user feedback data (e.g., click-count) for the documents referenced by these two lookup-URLs. A web clawer can use the predictions to decide whether or when to download a document, for instance. Or an index engine can use the predictions to decide when to process a document for a search index. As another example, a ranking engine can use the predictions to decide how to rank the documents as search results for a query.

In various implementations, the two lookup-URLs (4102 and 4014) are processed according to the same pattern extraction procedure as that used to in the process for building the database 4044. In this example, a hierarchy of five URL patterns (4106 and 4108) is generated for each lookup-URL. For URL_A (4102), the hierarchy of five URL patterns (4106) include: "site/," "site/news/," "site/news/f?/," "site/news/f?/date=x," and "site/news/f?/sub=food." For URL_B (4104), the hierarchy of five URL patterns (4108) include: "site/," "site/news/," "site/news/f?/," "site/news/f?/date=z," and "site/news/f?/sub=arts."

After the hierarchies of URL patterns are generated for the lookup-URLs, it is then determined for each lookup-URL whether the generated URL patterns match any of the repeated URL patterns stored in the database 4044. If any match is found, the lookup-URL is then associated with the URL classes that are defined by these matching repeated URL patterns.

In this example, the URL patterns generated for URL_A have four matching repeated URL patterns (4110) in the database 4044: "/site," "site/news/," "site/news/f?," and "site/news/f?/date=x." Correspondingly, URL_A is associated with four URL classes defined by these matching repeated URL patterns (i.e., URL Classes 1, 2, 3, and 4). Similarly, URL patterns generated for URL_B also have four matching repeated URL patterns (4112) in the database: "site/," "site/news/," "site/news/f?," and "site/news/f?/sub=arts." Correspondingly, URL_B is associated with the four URL classes defined by these four matching repeated URL patterns (i.e., URL Classes 1, 2, 3, and 5).

When predicting the data or signal for each lookup URL, the basic presumption is that URLs that have similar string patterns share similar document attributes, and hence have similar data/signal values (e.g., click-count) for those document attributes. Each URL typically contains one or more hierarchies of URL patterns, and can find several matching repeated URL patterns in the database. Therefore, several predictions (4114) can be generated based on the aggregated signals for these matching repeated URL patterns. These several predictions need to be integrated to produce a single prediction.

When integrating the several predictions, another presumption is that URLs that share a more specific URL pattern would behave more similarly than URLs that only share a more general URL pattern. For example, for two URLs that only share a "site/" pattern, the documents referenced by these two URLs are on the same site, but they are probably related to different topics and designed by different web designers. In contrast, for two URLs that not only share the "site/" pattern but also the "site/news/," the documents referenced by these two URLs not only are served on the same site, they are also found under the same file path, and therefore are more likely to share similar characteristics. In terms of predictions, a prediction based on the aggregated data of a more specific URL class is given more deference than a prediction based on the aggregated data of a more general URL class.

In some implementations, a confidence score (4116) is computed for the prediction from each URL class. In further implementations, the confidence score is associated with a weight of the prediction when predictions from different URL classes are integrated or combined to generate a final data prediction for a lookup-URL. In some implementations, sample data is taken from each URL class to generate the final, integrated data prediction. In some implementations, computation of the confidence scores takes into account of the number of data samples (e.g., total number of URLs in the URL class, the number of click-counts for each URL, the distribution of the data, the variance of the data, and so on) available in each URL class.

In this example, for URL_A, the most weight is given to the prediction from URL Class 4 (i.e., the most specific repeated URL pattern present in URL_A). The integrated prediction 4118 of the data is a click-count of 20. For URL_B, the most weight is given to the prediction from the URL Class 5 (i.e., the most specific repeated URL pattern present in URL_B). The integrated prediction 4120 of the data is a click-count of 70.

In this example, it appears that the URLs having the pattern "site/news/f?/date=x" receives less favorable user feedback than the URLs having the pattern "site/news/f?/sub=arts." This information can be used by a lookup client to identify "hot" and/or "cold" branches of a website. On the same site, some branches are more important, popular, and relevant than others, as reflected by the favorable user feedback signals. For example, on a news site, documents referenced by URLs having a "site/news/current/" pattern is potentially more important, popular, and relevant than documents referenced by URLs having a "site/archives/1954/" pattern. Using the signals predicted based on aggregated data of these two URL patterns, a crawler can schedule to crawl the "site/news/current" branch of the site first. Similarly, an index engine can process the documents from the "site/news/current" branch first. And, the ranking engine can rank documents from the "site/news/current" branch higher in a list of search results. In some implementations, a crawler can choose to remove URLs from its crawl schedule completely if they are from a particularly disfavored (e.g., minimal recorded and predicted clicks) branch of the site, such as "site/news/deleted/." Similarly, an index engine can remove all documents from the particularly disfavored branch of the site from the index database to improve retrieval time and conserve storage space.

Figure 5:
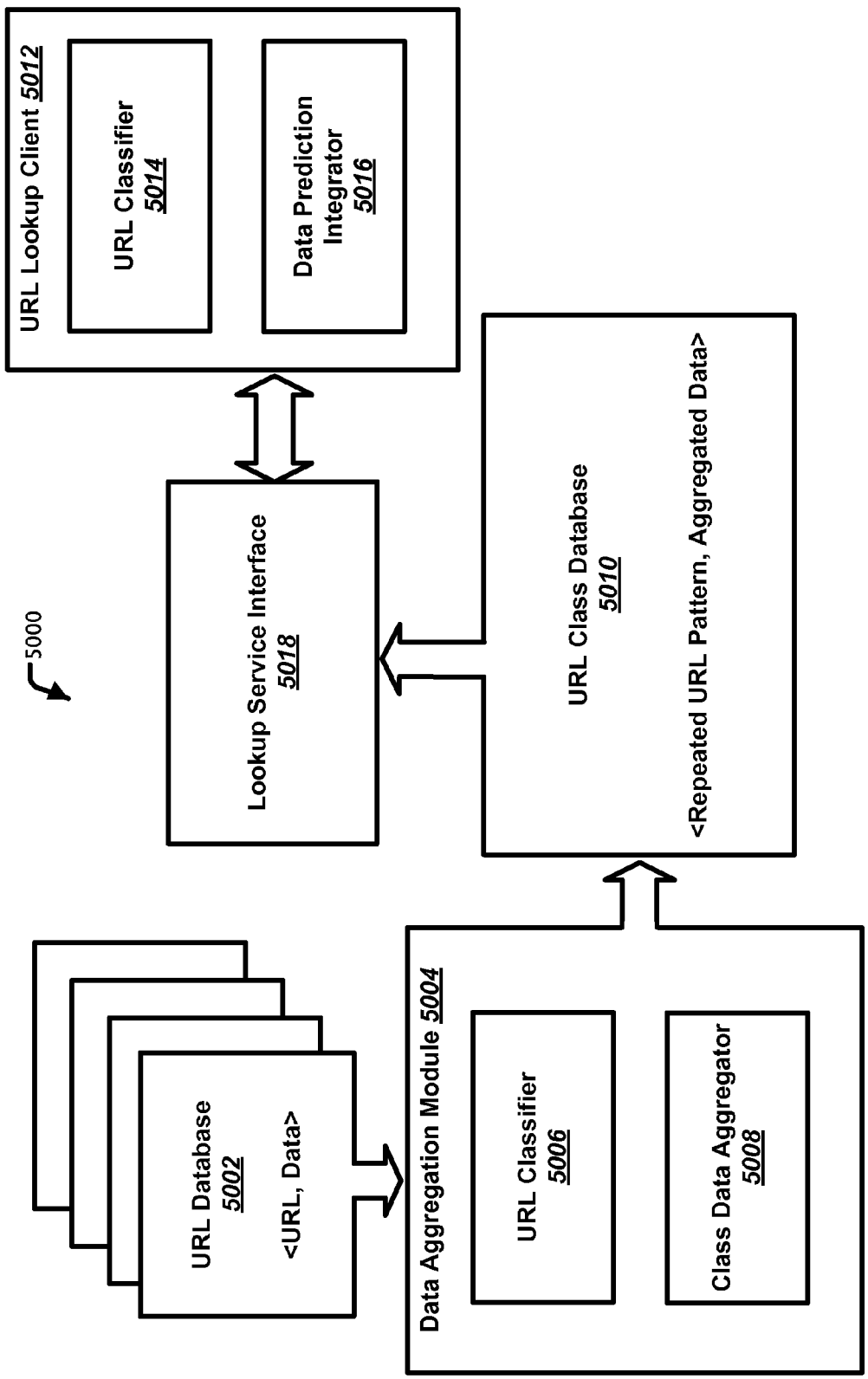
FIG. 5 illustrates an example database server and an example URL-lookup client implementing the example processes shown in FIGS. 4A and 4B.

FIG. 5 is a block diagram illustrating an example URL lookup system 5000 that implement the processes described in FIGS. 4A and 4B. One side of the system 5000 is the components for building the URL class database 5010. The URL class database 5010 includes one or more tables of <repeated URL pattern, aggregated data> pairs. The aggregated data include user feedback data (e.g., click-counts, click-to-impression ratios, etc.), as well as other data or signals of various documents attributes. Examples of other document attributes include document content, document type, topical category, life expectancy, and so on.

The left side of FIG. 5 shows a data aggregation module 5004. The data aggregation module can reside as a component or process (not shown) in the server system 1014 of FIG. 1, for example. The data aggregation module 5004 includes a URL classifier 5006 and a class data aggregator 5008. The data aggregation module 5008 receives input from data sources 5002 such as clicks logs and search indices. The input data are in the form of <URL, data> pairs. The URL classifier 5006 processes the URLs to generate one or more hierarchies of URL patterns. The URL classifier 5006 further selects repeated URL patterns from the generated hierarchies of URL patterns to define URL classes. The URL classifier 5006 then associates each URL class with a respective group of URLs. Each of the group of URLs contains the repeated URL pattern that defines the URL class. A different URL classifier can be used for a different type of lookup client (e.g., a web crawler, an index engine, or a ranking engine).

After the URL classes are defined and associated with their respective groups of URLs, the class data aggregator 5008 generates an aggregated class signal (or aggregated data) for each URL class. Different aggregation procedures can be implemented for different types of signals. For example, for click-counts, the aggregated data include a mean of the click-counts associated with the URLs in the URL class. Some additional data is recorded as well, such as the total number of URLs in the class, and the variance of the click-counts within the URL class.

The data aggregation module 5004 stores the repeated URL patterns and corresponding aggregated data in the URL class database 5010. In some implementations, the URL class database 5010 is updated as additional URLs and associated data or signals are processed by the data aggregation module 5004. For example, when new URLs are processed, new URL classes and associated aggregated data are added to the URL class database 5010. In addition, as new data become available or as existing data are updated, the aggregated data for existing URL classes are updated.

The right side of FIG. 5 is a URL lookup client 5012. The URL lookup client 5012 includes a URL classifier 5014 and a data prediction integrator 5016. The URL classifier 5014 implements the same pattern extraction procedure as the URL classifier 5006 of the data aggregation module 5004. The URL lookup client 5012 can be a component of a web crawler (e.g., 1028 in FIG. 1), an index engine (e.g., 1020 in FIG. 1), a ranking engine (e.g., 1052), or a rank modifier engine (e.g., 1056 in FIG. 1). The URL lookup client 5012 receives a lookup-URL and processes the lookup-URL according the pattern extraction procedure as described with respect to FIG. 4B. The URL classifier 5014 generates one or more hierarchies of URL patterns from the lookup-URL.

The lookup client 5012 queries a lookup service interface 5018 using these generated hierarchies of URL patterns. The lookup service interface 5018 can reside in the server system 1014 of FIG. 1 (not shown in FIG. 1), for example. The lookup services interface 5018 provides a fast and efficient way for the lookup client 5012 to locate all the URL classes that are defined by repeated URL patterns that are present in the lookup-URL string. Not all of the generated hierarchies of URL patterns in the lookup-URL have matching repeated URL patterns in the database 5010. However, if a lookup-URL finds some matching repeated URL patterns (or URL classes), the lookup service interface 5018 returns the aggregated data of each URL class that are defined by a matching repeated URL pattern. Each of the aggregated data serves as a prediction or estimated data for the lookup-URL. Each of the prediction or estimated data is associated with a confidence score. The confidence score depends on the level of specificity associated with the URL class. In general, a more general URL class is given a lower confidence score, and a more specific class is given a higher confidence. Other factors that affect the confidence score include the number of samples in the URL class. A larger sample tends to boost the confidence score, and a smaller sample tends to lower the confidence score. Furthermore, the variance within the sample in the URL class will also affect the confidence score. For example, a large variance tends to lower the confidence score, and a smaller variance tends to improve the confidence score.

In some implementations, the URL lookup client 5012 receives predicted or estimated data from all matching URL classes. In some implementations, a data prediction integrator 5016 generates a single data prediction by integrating predictions from all matching URL classes. In some implementations, the data prediction integrator 5016 gives different weight to the data prediction from each URL class based on its respective confidence score. Other methods of integration are possible.

FIG. 6A is a flow diagram of an example process 6000 for predicting user feedback data for a lookup-URL based on aggregated user feedback data of repeated URL patterns.

The process starts when a plurality of Uniform Resource Locator (URL) strings are received (6002). Each of the URL strings refers to a respective document, such as a webpage on a website, or a blog post on a blog site. Each of the documents is associated with respective data. The respective data is indicative of user behavior relative to the respective document as a search result for queries. The respective data includes one or more of click-counts, click-durations, impression-count, click-to-impression ratio, and so on. In some implementations, the data also includes the number of queries to which the document was responsive, the mean and the variance of the click-durations, and so on. In some implementations, the user feedback data are associated with document-query pairs, and the data is first aggregated across queries such that the data becomes query-independent.

After the URL strings are received, one or more hierarchies of string patterns are generated from each of the plurality of URL strings according to a pattern extraction procedure (6004). In some implementations, the pattern extraction procedure is implemented in the URL classifier 5006 as described with respect to FIG. 5. In some implementations, each URL is pre-processed, such that the resulting URL string follows a strict hierarchical structure and a hierarchy of string patterns results when the pre-processed URL string is truncated segment by segment (e.g., as described with respect to the example shown in Table 1).

Once the URLs are processed and one or more hierarchies of string patterns are generated from each URL according to the pattern extraction procedure, a plurality of repeated string patterns are selected from the generated hierarchies of string patterns for the plurality of URL strings (6006). In some implementations, the string patterns generated from each URL string are stored as <URL, string pattern> pairs in a database. After all the URLs are processed and their respective string patterns are stored in the database, the database entries are sorted according to string patterns. This way, repeated string patterns, as well as all the URLs that contain the repeated string patterns, are easily identified.

Once the repeated URL patterns are selected, a URL class is defined for each of the plurality of repeated string patterns (6008). URLs that contain a particular repeated string pattern are associated with a respective URL class defined by that particular repeated string pattern. Therefore, each respective URL class is associated with a respective group of URL strings in the plurality of URL strings. Each of the respective group of URL strings contains a repeated string pattern that defines the URL class. The above URL classification process is implemented, for example, by the URL classifier 5006 as described with respect to FIG. 5.

Once the URL classes are defined, respective aggregated data for each respective URL class is calculated (6010). The respective aggregated data for each URL class is based on respective data of each respective document of each URL string in the group of URL strings associated with the URL class. In some implementations, the aggregation of data is an averaging of the data across all URLs within the URL class. In some implementations, a total number of URLs in the URL class, a mean and a variance of the data are recorded as the aggregated data as well. Other methods of data aggregation are possible. Another example aggregation method includes calculating a weighted average of the data based on the freshness of the data.

Once the aggregated data is calculated, the aggregated data is stored in a URL class database. The URL class database is indexed by the repeated URL patterns, and each aggregated data is stored as values associated with a corresponding repeated URL pattern. Respective data for a document referenced by a lookup-URL string is predicted based on respective aggregated data of one or more of the URL classes (6012). The one or more of the URL classes are defined by the repeated URL patterns that match the URL patterns present in the lookup-URL.

Figure 6B:
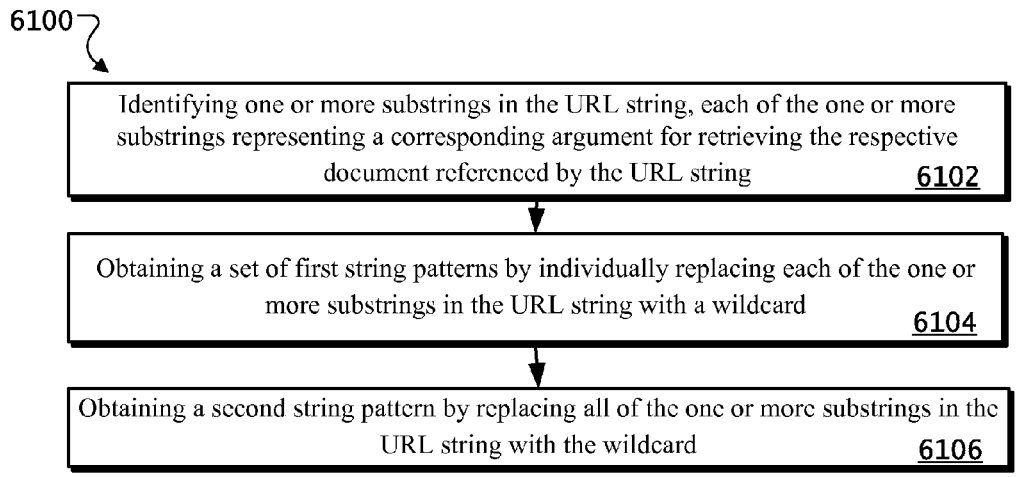
FIGS. 6B-6D are flow diagrams of example processes for generating hierarchies of string patterns from a URL.

FIG. 6B is an example process 6100 for generating (part of) a hierarchy of string patterns from a URL. According to a pattern extraction procedure, first, one or more substrings in the URL string are identified (6102). Each of the one or more substrings represents an argument for retrieving the respective document referenced by the URL string. Many web documents are retrieved by a script running on a web server. Sometimes, web documents are dynamically generated on the fly by the script based on the arguments. An example URL, "http://weather.cnn.com/weather/forecastjsp?zipCode=74446&date=today" includes two arguments represented by the two substrings "zipCode=74446" and "date=today." This URL causes a document showing the weather forecast for the "74446" zip code area on a current date to be retrieved or dynamically generated by a script "forecast.jsp" running on the host "weather" of the domain "cnn.com."

Once the substrings are identified, a set of first string patterns are obtained by individually replacing each of the one or more substrings in the URL string with a wildcard (6104). Each time, only one argument is replaced while the rest of the arguments remain in the URL string. For example, by replacing the first argument with a wildcard, the URL pattern generated is "http://weather.cnn.com/weather/forecastjsp?date=today." By replacing the second argument with a wildcard, the URL pattern generated is "http://weather.cnn.com/weather/forecastjsp?zipCode=74446." The first URL pattern is independent of the first argument, and the second URL pattern is independent of the second argument. These two URL patterns have the same level of specificity. In some implementations, the URL is preprocessed, and the URL patterns obtained are "com/cnn/weather/forecast.jsp?/date=today" and "com/cnn/weather/forecast.jsp?/zipCode=74446."

After each argument is individually replaced with a wildcard to obtain the first set of string patterns, a second string pattern is obtained by replacing all of the one or more substrings in the URL string with the wildcard (6106). Continue with the example above, by replacing all of the arguments with a wildcard together, the URL pattern obtained is argument independent. The argument independent string pattern is more general than the URL patterns that include at least one argument. The argument independent pattern generated is "com/cnn/weather/forecast.jsp?/." In some implementations, replacing sub-combinations of arguments with a wildcard can create additional intermediate levels of string patterns.

Figure 6C:
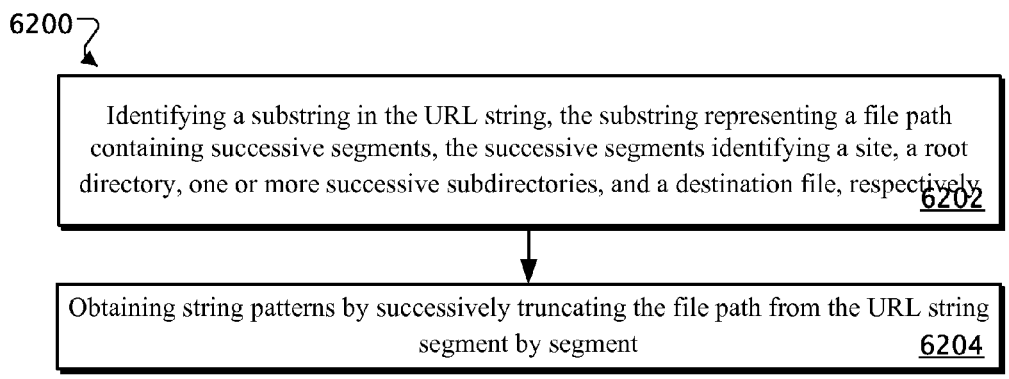

In addition to removing arguments from the URL string to generate string patterns, additional string patterns are generated by successively removing other substrings from the URL. FIG. 6C is a flow diagram illustrating an example process 6200 for generating (part of) a hierarchy of URL patterns by truncating the URL string segment by segment. First, a substring is identified in the URL string, where the substring represents a file path containing successive segments identifying a site, a root directory, one or more successive subdirectories, and a destination file, respectively (6202). For example, a URL string http://weather.cnn.com/forecast/fiveday/forecast.htm" includes a substring "weather.cnn.com/forecast/fiveday/forecast.htm." The substring includes a segment for a site "weather.cnn.com/," a segment "forecast/" for the root directory, a segment "fiveday/" for the subdirectory, and a segment "forecast.htm" for the destination file. One of the hierarchies of string patterns is obtained by successively truncating the file path from the URL string segment by segment (6204). Each time a segment is truncated, a string pattern is created. As additional segments are truncated from the URL string, string patterns of less and less specificity are generated. If the URL string is preprocessed to "com/cnn/weather/forecast/fiveday/forecast.htm," the hierarchy of string patterns, in an order from more specific to more general, includes: "weather.cnn.com/forecast/fiveday/forecast.htm," "weather.cnn.com/forecast/fiveday/," "weather.cnn.com/forecast/," and "weather.cnn.com/."

In some implementations, the remaining URL string after the entire file path has been truncated further includes segments for "host name," "domain name," "generic top-level domain extension" and "country code extension," (e.g., "weather.cnn.com.uk"). In some implementations, the URL string is preprocessed, so the remaining URL string is in the form of "uk/com/cnn/weather/." Additional URL string patterns are obtained by successively truncating the remaining URL string segment by segment. The additional URL patterns obtained include: "uk/com/cnn/weather/," "uk/com/cnn/," "uk/com/" and "uk/."

In some implementations, the process described with respect to FIG. 6C is combined with the process described with respect to FIG. 6B. For example, after generating string patterns by removing all of the arguments in the URL string, additional string patterns are generated by successively truncating the file path from the remaining URL string.

Figure 6D:
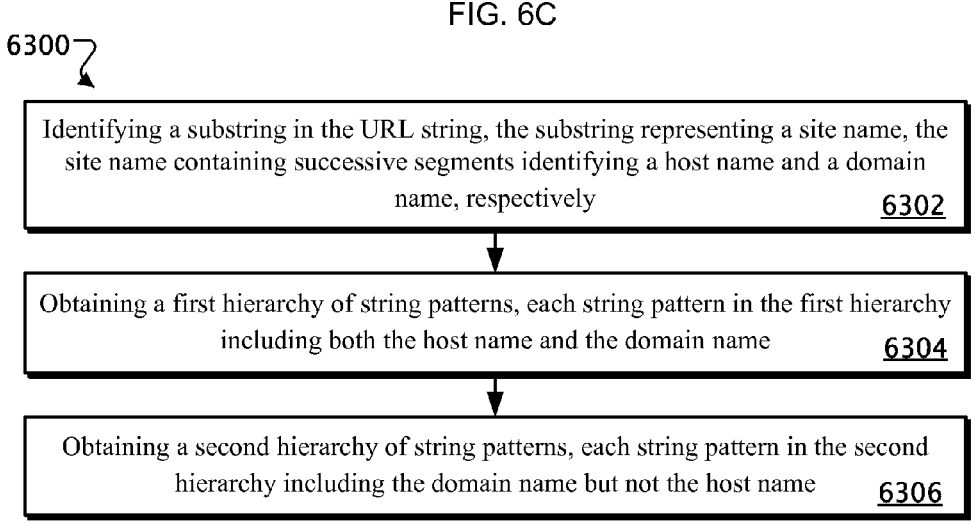

One hierarchy of string patterns is generated by removing arguments and segments of the URL string according to the example processes described with respect to FIGS. 6B and 6C. FIG. 6D describes an example process 6300 for generating another hierarchy of string patterns. The other hierarchy of string patterns is generated based on the first hierarchy of string patterns generated according to the processes in FIGS. 6B and 6C.

First, a substring is identified in the URL string (6302). The substring represents a site name. The site name contains successive segments identifying a host name and a domain name, respectively. A first hierarchy of string patterns is obtained, where each string pattern in the first hierarchy includes both the host name and the domain name (6304). The first hierarchy of string patterns can be obtained according to the processes described with respect to FIGS. 6B and 6C. A second hierarchy of string patterns is obtained, where each string pattern in the second hierarchy includes the domain name but not the host name (6306). To obtain the second hierarchy of string patterns, the host name present in the first hierarchy of string patterns is replaced with a wildcard, and a new string pattern is generated for each string pattern that previously contained the host name.

The second hierarchy of string patterns is useful in scenarios where a blog server uses individual usernames as the host name. In addition to obtaining a hierarchy of string patterns for each individual user, a second, user-independent hierarchy of string patterns is also obtained for the blog site. For example, popular blog accounts and/or inactive blog accounts are identifiable using the aggregated user feedback data of the user-specific hierarchy of string patterns. In addition, particular "hot" or "cold" branches of the blog site applicable to all users are identifiable using the aggregated user feedback data of the user-independent hierarchy of string patterns.

Figure 6E:
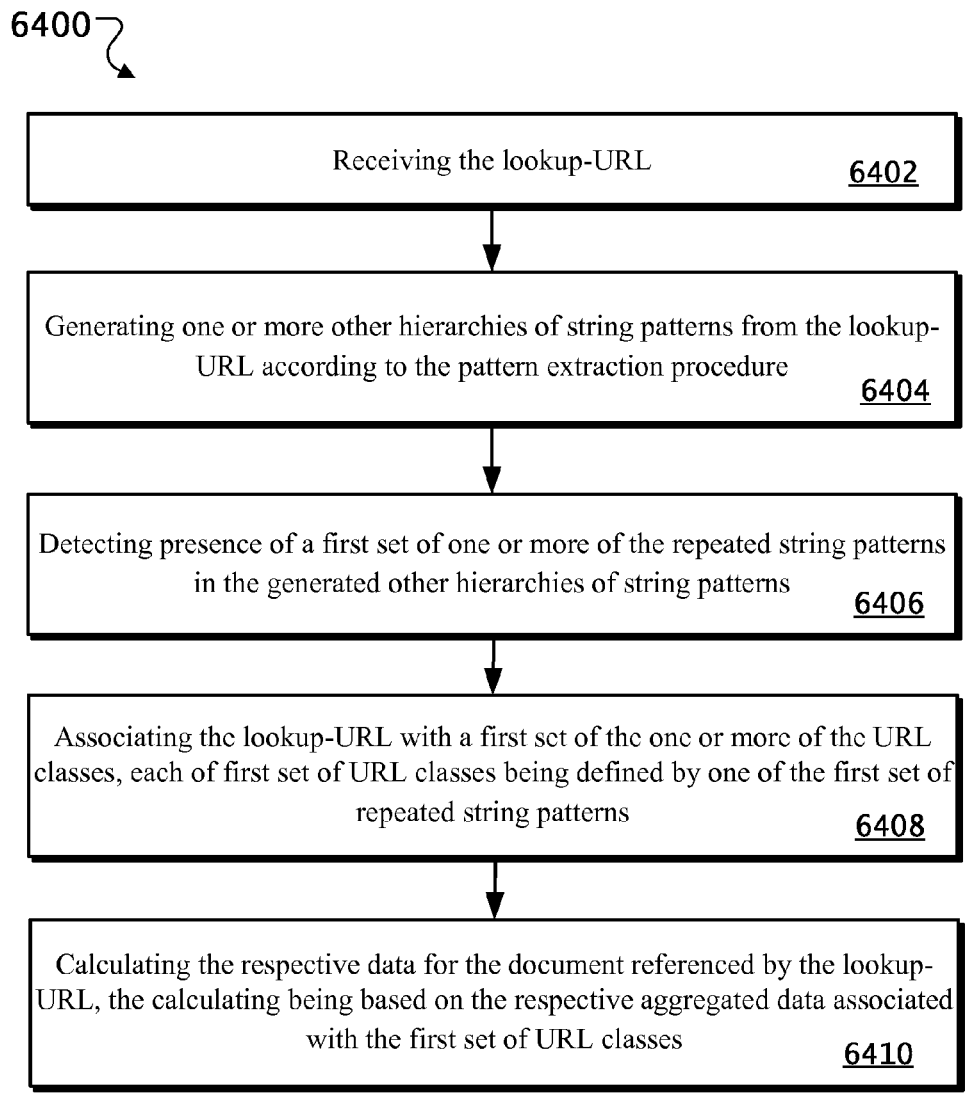
FIG. 6E is a flow diagram of an example process for predicting user-feedback statistics based on aggregated data of repeated URL patterns present in the lookup-URL.
Figure 6F:
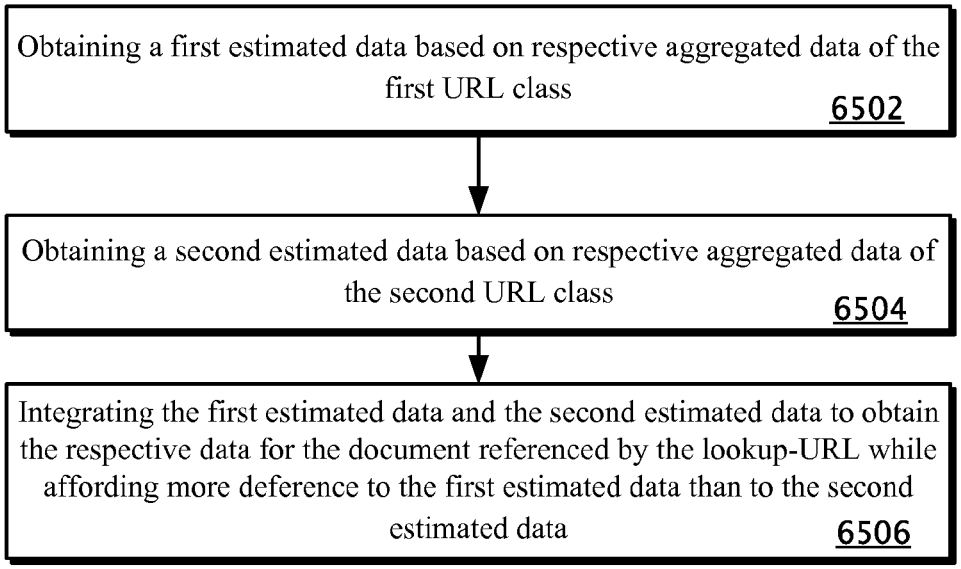
FIG. 6F is a flow diagram of an example process for integrating predictions based on aggregated data of two different repeated URL patterns.

FIG. 6E illustrates an example process 6400 for predicting user feedback data using the aggregated data of the repeated URL patterns. First, a lookup URL string is received (6402). In some instances, the URL string is a new URL collected by a web crawler, and the web crawler seeks to acquire information on the URL to decide whether to download the document immediately, to wait to download the document later, or to discard it from the "crawl frontier" entirely. In some implementations, the URL refers to a document already downloaded by the web crawler, but has not been processed by the index engine or stored in the search index. The index engine seeks the information to decide whether to process the document immediately or wait to process it later. In some implementations, the URL is selected as a candidate search result for a query (e.g., based on keywords matching). If the URL itself does not have sufficient user feedback data to determine how it will be received by users, the search engine queries the URL class database to get a prediction of user feedback data and uses the prediction as input for ranking the candidate search result.

Once the lookup URL is received, the lookup URL is processed according to the same pattern extraction procedure as that used for building the URL class database. One or more other hierarchies of string patterns are generated from the lookup-URL string (6404). The lookup process involves sending the one or more other hierarchies of string patterns to a lookup service interface. The lookup service interface searches the URL class database to determine which ones of the submitted string patterns match the repeated URL patterns already stored in the database. Presence of a first set of one or more of the repeated string patterns is detected in the generated other hierarchies of string patterns (6406). Once the first set of repeated string patterns are detected, the lookup-URL is associated with a first set of the one or more of the URL classes, where each of the first set of URL classes are defined by one of the first set of repeated string patterns (6408).

Then, the respective data for the document referenced by the lookup-URL is calculated (6410). The calculation is based on the respective aggregated data associated with the first set of URL classes that are defined by the detected first set of repeated string patterns. The calculated respective data is a prediction indicative of user behavior relative to the respective document referenced by the lookup-URL as a search result for queries.

In some implementations, a lookup-URL finds several matching repeated string patterns in the URL class database. The several matching repeated string patterns produce several different predictions for the respective data. FIG. 6E is flow diagram of an example process 6500 for integrating predictions from several URL classes to generate a single data prediction for a document referenced by the lookup-URL. For example, the lookup-URL is associated with a first URL class and a second URL class, and the first URL class is of a higher level of specificity than the second URL class. A first estimated data based on respective aggregated data of the first URL class is obtained (6502). A second estimated data based on respective aggregated data of the second URL class is obtained (6504). Then, the first estimated data and the second estimated data are integrated to obtain the respective data for a document referenced by the lookup-URL while more deference is afforded to the first estimated data than to the second estimated data (6506). In some implementations, a confidence score is associated with the level of specificity for each URL class, and a higher confidence score is given to a URL class defined by a more specific repeated URL pattern.

In addition to predicting user feedback statistics, the same methods are applicable to predict other data or signals of document attributes, such as document importance, relevance, popularity, and quality. FIG. 7A shows an example process 7000 for predicting data/signal of a document attribute for a lookup-URL using aggregated data of repeated URL patterns.

First, a plurality of Uniform Resource Locator (URL) strings are received (7002). Each URL string refers to a respective document. Each respective document is associated with respective data for a document attribute. In some implementations, the document attribute is a life expectancy of a document. The respective data for the document attribute is duration between initial detection and a subsequent detection failure of the document by an information retrieval system. In some implementations, the respective data for the document attribute is duration between initial detection of a first version of the document and a subsequent detection of a second version of the document. In some implementations, the document attribute is a measure of quality for a document, and the respective data for the document attribute is a number of links to the document by other documents. In some implementations, the document attribute is a measure of commerciality for a document, and the respective data for the document attribute is a number of advertisements presented on the document. In some implementations, the document attribute is a topical category for a document, and the respective data for the document attribute is a number of predetermined keywords for the topical category that are present in the document. Other examples of document attributes are possible. Other signals of documents attributes are possible.

After the URL strings are received, one or more hierarchies of string patterns are generated from each of the plurality of URL strings according to a pattern extraction procedure (7004). Then, a plurality of repeated string patterns are selected from the generated hierarchies of string patterns for the plurality of URL strings (7006). A URL class is defined for each of the plurality of repeated string patterns (7008). Each URL class is associated with a respective group of URL strings in the plurality of URL strings. The respective group of URL strings contains a repeated string pattern that defines the URL class. Respective aggregated data is calculated for each URL class based on the respective data of each respective document of each URL string in the group of URL strings associated with the URL class (7010). The method for computing the aggregated data of a URL class may vary depending on the type of the data and/or document attribute involved. In some implementations, the document attribute is a lifespan of a document. As an example, the data for the document attribute is duration between the initial discovery of the document and a subsequent detection failure of the document. The aggregated data for a URL class includes the number of URLs in the URL class, a mean of the duration, and a variance of the duration. Once the aggregated data are computed, respective data for a document referenced by a lookup-URL is predicted (7012). The prediction is based on respective aggregated data of one or more of the URL classes.

Figure 7B:
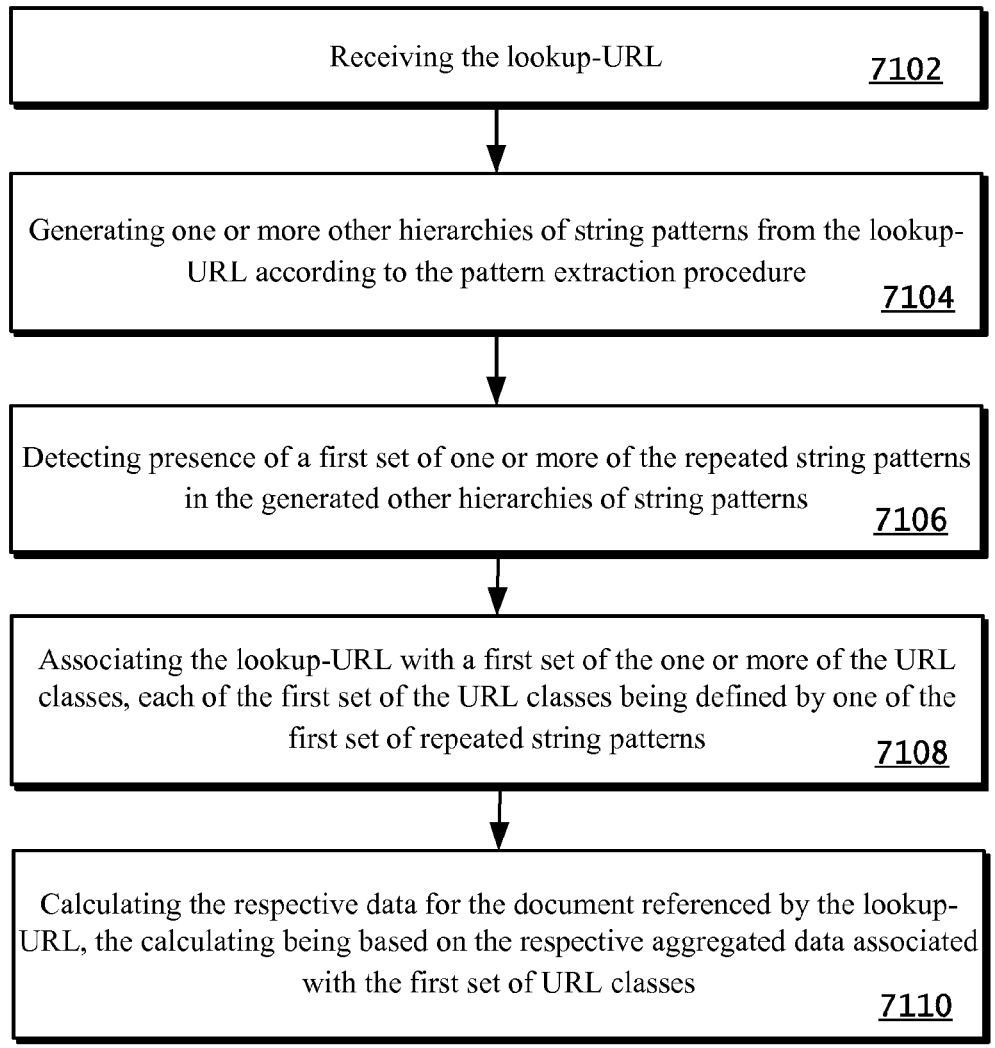
FIG. 7B is a flow diagram of an example process for predicting a document attribute for a lookup-URL based on aggregated data of repeated URL patterns present in the lookup URL.

FIG. 7B illustrates an example process 7100 for predicting data for the document attribute using the aggregated data of one or more repeated URL patterns. First, the lookup-URL string is received (7102). One or more other hierarchies of string patterns are generated from the lookup-URL according to the pattern extraction procedure (7104). Presence of a first set of one or more of the repeated string patterns are detected in the generated other hierarchies of string patterns (7106). The lookup-URL is associated with a first set of the one or more of the URL classes, where each of the first set of URL classes is defined by one of the first set of repeated string patterns (7108). Respective data for the document referenced by the lookup-URL is calculated (7110). The calculation is based on the respective aggregated data associated with the first set of URL classes. The calculated respective data is a prediction indicative of the document attribute of the document referenced by the lookup-URL.

In some implementations, the document attribute is an update frequency of the document. The data prediction is provided as input to a crawl scheduling process of a web crawler. The web crawler uses this data prediction to decide when to visit the document again to get an update, or when to delete it from the "crawl frontier." For example, a breaking news section of a news website is updated constantly, and needs to be crawled daily, even hourly. In contrast, an archive section of the news website is rarely updated, and needs to be crawled only once. The web crawler can use the data prediction to identify these fast changing and/or stable sections of the news website, and schedule its visits accordingly.

In some implementations, the document attribute is a lifespan of the document. The data prediction is provided as input to an index selection process of an index engine. The index engine uses the data prediction to decide when to remove a document from its search index. For example, an online auction portal includes pages for items that are being auctioned. These pages become obsolete when the auction closes. The index engine can use the data prediction to determine the lifespan of the page and remove the page from its search index when the auction closes and the page becomes obsolete.

In some implementations, the document attribute is document relevance. The data prediction is provided as input to a search result ranking process of a ranking engine. The ranking engine uses the data prediction to boost or demote the document as a search result for a query depending on the predicted data. In some implementations, the predicted data is given less weight in the search result ranking process than actual data collected for the document.

Other example applications of the data predictions for various document attributes are possible.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining a plurality of Uniform Resource Locator (URL) strings, each URL string referring to a respective document, each respective document being associated with respective data, the respective data being derived from, at least, a count of times that the respective document was viewed for longer than a threshold period of time when the respective document was identified by search results responsive to queries;
generating a plurality of respective groups of different strings from the plurality of URL strings according to a pattern extraction procedure;
identifying a plurality of repeated strings, each repeated string occurring in two or more of the respective groups;
for each repeated string, combining the respective data associated with different URL strings of the plurality of URL strings that contain the repeated string;
generating a plurality of first strings from a first URL that references a document according to the pattern extraction procedure; and
calculating respective data for the document based on the combined respective data for each repeated string that matches one of the first strings.

2. The method of claim 1, wherein each respective data includes a click-count.

3. The method of claim 1, wherein generating the plurality of respective groups of different strings from each of the plurality of URL strings according to the pattern extraction procedure further comprises:

identifying one or more substrings in the URL string, each of the one or more substrings representing a corresponding argument for retrieving the respective document referenced by the URL string;

obtaining a set of first respective strings by individually replacing each of the one or more substrings in the URL string with a wildcard; and obtaining a second respective string by replacing all of the one or more substrings in the URL string with the wildcard.

4. The method of claim 1, wherein generating the plurality of respective groups of different strings for each of the plurality of URL strings according to the pattern extraction procedure further comprises:

identifying a substring in the URL string, the substring representing a file path containing successive segments, the successive segments identifying a site, a root directory, one or more successive subdirectories, and a destination file, respectively; and obtaining the respective strings by successively truncating the file path from the URL string segment by segment.

5. The method of claim 1, wherein generating the plurality of respective groups of different strings for each of the plurality of URL strings according to the pattern extraction procedure further comprises:

identifying a substring in the URL string, the substring representing a site name, the site name containing successive segments identifying a host name and a domain name, respectively;

obtaining first respective strings, each first string including both the host name and the domain name; and obtaining second respective strings, each second string including the domain name but not the host name.

6. The method of claim 1 wherein one of the first strings matches a first repeated string and another of the first strings matches a second repeated string, the first repeated string being of a higher level of specificity than the second repeated string, and wherein calculating the respective data for the document referenced by the first URL further comprises:

obtaining a first estimated data based on the combined respective data for the first repeated string;

obtaining a second estimated data based on the combined respective data for the second repeated string; and integrating the first estimated data and the second estimated data to obtain the respective data for the document referenced by the URL while affording more deference to the first estimated data than to the second estimated data.

7. A system comprising:

computer storage medium having instructions stored thereon; and data processing apparatus configured to execute the instructions to perform operations comprising:

obtaining a plurality of Uniform Resource Locator (URL) strings, each URL string referring to a respective document, each respective document being associated with respective data, the respective data being derived from, at least, a count of times that the respective document was viewed for longer than a threshold period of time when the respective document was identified by search results responsive to queries;

generating a plurality of respective groups of different strings from the plurality of URL strings according to a pattern extraction procedure;

identifying a plurality of repeated strings, each repeated string occurring in two or more of the respective groups;

for each repeated string, combining the respective data associated with different URL strings of the plurality of URL strings that contain the repeated string;

generating a plurality of first strings from a first URL that references a document according to the pattern extraction procedure; and calculating respective data for the document based on the combined respective data for each repeated string that matches one of the first strings.

8. The system of claim 7, wherein each respective data includes a click-count.

9. The system of claim 7, wherein generating the plurality of respective groups of different strings from each of the plurality of URL strings according to the pattern extraction procedure further comprises:

identifying one or more substrings in the URL string, each of the one or more substrings representing a corresponding argument for retrieving the respective document referenced by the URL string;

obtaining a set of first respective strings by individually replacing each of the one or more substrings in the URL string with a wildcard; and obtaining a second respective string by replacing all of the one or more substrings in the URL string with the wildcard.

10. The system of claim 7, wherein generating the plurality of respective groups of different strings for each of the plurality of URL strings according to the pattern extraction procedure further comprises:

identifying a substring in the URL string, the substring representing a file path containing successive segments, the successive segments identifying a site, a root directory, one or more successive subdirectories, and a destination file, respectively; and obtaining the respective strings by successively truncating the file path from the URL string segment by segment.

11. The system of claim 7, wherein generating the plurality of respective groups of different strings for each of the plurality of URL strings according to the pattern extraction procedure further comprises:

identifying a substring in the URL string, the substring representing a site name, the site name containing successive segments identifying a host name and a domain name, respectively;

obtaining first respective strings, each first string including both the host name and the domain name; and obtaining second respective strings, each second string including the domain name but not the host name.

12. The system of claim 7 wherein one of the first strings matches a first repeated string and another of the first strings matches a second repeated string, the first repeated string being of a higher level of specificity than the second repeated string, and wherein calculating the respective data for the document referenced by the first URL further comprises:

obtaining a first estimated data based on the combined respective data for the first repeated string;

obtaining a second estimated data based on the combined respective data for the second repeated string; and integrating the first estimated data and the second estimated data to obtain the respective data for the document referenced by the first URL while affording more deference to the first estimated data than to the second estimated data.

* * * * *